US012118143B1

(12) United States Patent
Sharma et al.

(10) Patent No.: US 12,118,143 B1
(45) Date of Patent: Oct. 15, 2024

(54) PANCAKE LENSES WITH INTEGRATED ACCOMMODATION

(71) Applicant: Meta Platforms Technologies, LLC, Menlo Park, CA (US)

(72) Inventors: Robin Sharma, Woodinville, WA (US); Afsoon Jamali, Issaquah, WA (US); Brent Bollman, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/193,663

(22) Filed: Mar. 31, 2023

Related U.S. Application Data

(60) Provisional application No. 63/379,236, filed on Oct. 12, 2022.

(51) Int. Cl.
*G06F 3/01* (2006.01)

(52) U.S. Cl.
CPC .......... *G06F 3/013* (2013.01); *G06T 2207/10* (2013.01)

(58) Field of Classification Search
CPC ....................................................... G06F 3/01
See application file for complete search history.

(56) References Cited

U.S. PATENT DOCUMENTS

2020/0341315 A1* 10/2020 Gollier ...................... G02B 1/08
2020/0348528 A1* 11/2020 Jamali ..................... G02B 27/28

* cited by examiner

*Primary Examiner* — Sardis F Azongha
(74) *Attorney, Agent, or Firm* — Greenberg Traurig, LLP

(57) ABSTRACT

An apparatus for a pancake lens with integration accommodation may include a beamsplitter, a first lens, a reflective polarizer, and a second lens, where the second lens includes at least one planar module embedded within the second lens. Other apparatuses, systems, and methods are also disclosed.

20 Claims, 12 Drawing Sheets

PANCAKE LENSES WITH INTEGRATED ACCOMMODATION

CROSS-REFERENCE TO RELATED APPLICATION

This application claims the benefit of U.S. Provisional Application No. 63/379,236, filed 12 Oct. 2022, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, the drawings demonstrate and explain various principles of the present disclosure.

Figure 1:
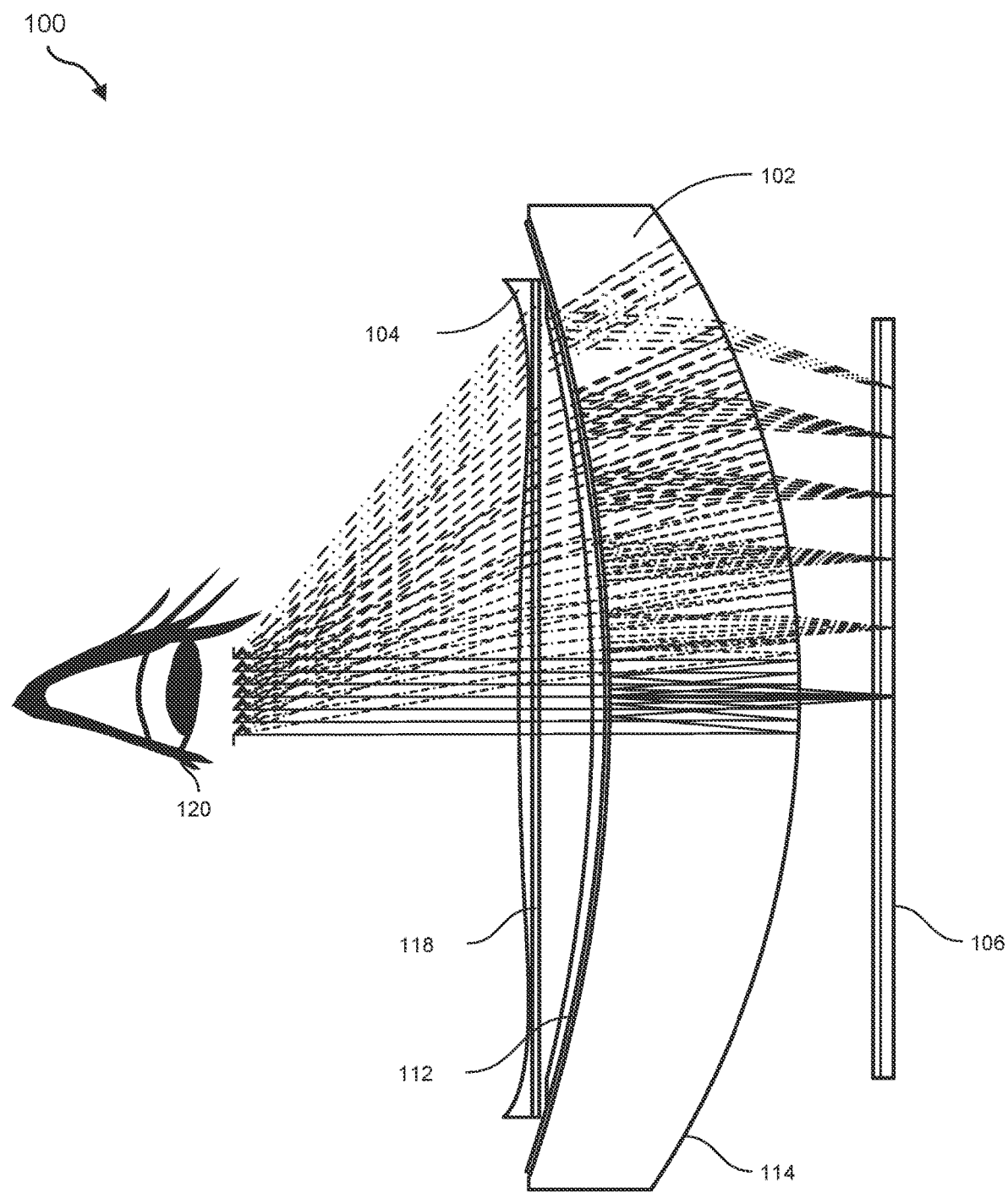
FIG. 1 illustrates an example pancake lens with embedded accommodation module according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

The present disclosure is generally directed to devices and systems with optical configurations that may provide adjustable accommodation. Optical configurations including one or more pancake lenses may be used in various applications, such as AR/VR applications, cameras, projection apparatuses, and other optical systems. Compact optical systems may be useful for head-mounted displays, including virtual and augmented reality apparatus. Varifocal operation may be useful for user comfort and experience.

The integration of additional functional elements in pancake lenses, such as a device to provide variable accommodation, may be difficult due to the lack of space and tight design constraints. To avoid adding air-immersed elements while also minimizing impact on eye-relief, one or more planar modules may be embedded within one of the two principal lenses of the pancake lens (e.g., in the lens closer to the eye). Thus, for example, the embedding lens may be produced in two separate parts, and these parts, along with any planar modules to be embedded in the pancake lens, may be laminated together. Parts of the embedding lens may be injection molded or 3D printed. In some embodiments, a guided refractive index liquid crystal lens accommodation module may be embedded. In some embodiments, an eye-tracking module may be embedded. The eye-tracking module may use photonic integrated circuits. Eye-tracking cameras (or sensors) may be placed around the module, behind (and, e.g., to the side of) the eye-side lens (pointed toward a holographic optical element combiner film on the eye-tracking module), or inside the module. In some examples, the eye-tracking module may also provide illumination for eye tracking.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-10, detailed descriptions of pancake lenses with embedded modules and such modules for embedding. The discussion with reference to FIGS. 11-12 relates to example augmented/virtual reality devices that may incorporate pancake lenses with embedded modules and described herein.

FIG. 1 illustrates an example pancake lens 100 with an embedded accommodation module. As shown in FIG. 1, pancake lens 100 may include a lens 102 and a lens 104. Pancake lens 100 may also include a beamsplitter 114. As used herein, the term "beamsplitter" may refer to any optical element that partially reflects and partially transmits light. In some examples, a beamsplitter may transmit about 50% of light and reflect about 50% of light. In some examples, beamsplitter 114 may be coupled (e.g., as a film, a coating, etc.) to the display side of lens 102. In addition, pancake lens may include a reflective polarizer 112. As used herein, the term "reflective polarizer" may refer to any optical element that reflects or transmits light based on the polarization state of the light. In some examples, reflective polarizer 112 may be situated between lens 102 and 104. For example, reflective polarizer 112 may be coupled (e.g., as a film) to the eye side of lens 102.

In addition, pancake lens 100 may include an accommodation module 118. In some examples, accommodation module 118 may be planar. For example, accommodation module 118 may be a planar lens, such as a liquid crystal lens. For example, accommodation module 118 may include a gradient-index liquid crystal ("GRIN LC") lens and/or a Pancharatnam-Berry phase ("PBP") lens. In some examples, accommodation module 118 may be a non-planar liquid crystal lens. In general, accommodation module 118 may include any module that provides variable and/or adjustable optical power.

As illustrated in FIG. 1, in some embodiments accommodation module 118 may be embedded into lens 104. For example, as will be explained in greater detail below, lens 104 may be divided into two parts and accommodation module 118 may be positioned between the two parts of lens 104. Accommodation module 118 may be embedded within (e.g., coupled to the parts of) lens 104 in any suitable manner. For example, accommodation module 118 may be laminated to and/or bonded with parts of lens 104. In some examples, accommodation module 118 may be connected to a driving circuit (e.g., using flexible cables or other means) that controls and/or actuates the varifocal capabilities of accommodation module 118. In some examples (including the example pictured in FIG. 1), the planar module may run along a transverse axis of the second lens. In some examples, the planar module may run all the way through the second lens. In other examples, the planar module may run partially through the second lens. By way of example, without limitation, the planar module may occupy at least 99% of the area of intersection of the transverse axis with the second lens, at least 98%, at least 95%, at least 90%, at least 80%, at least 60%, or at least 50%.

As can be seen in FIG. 1, a display 106 may produce an image that may be transmitted via pancake lens 200 to an eyebox 220.

Figure 2:
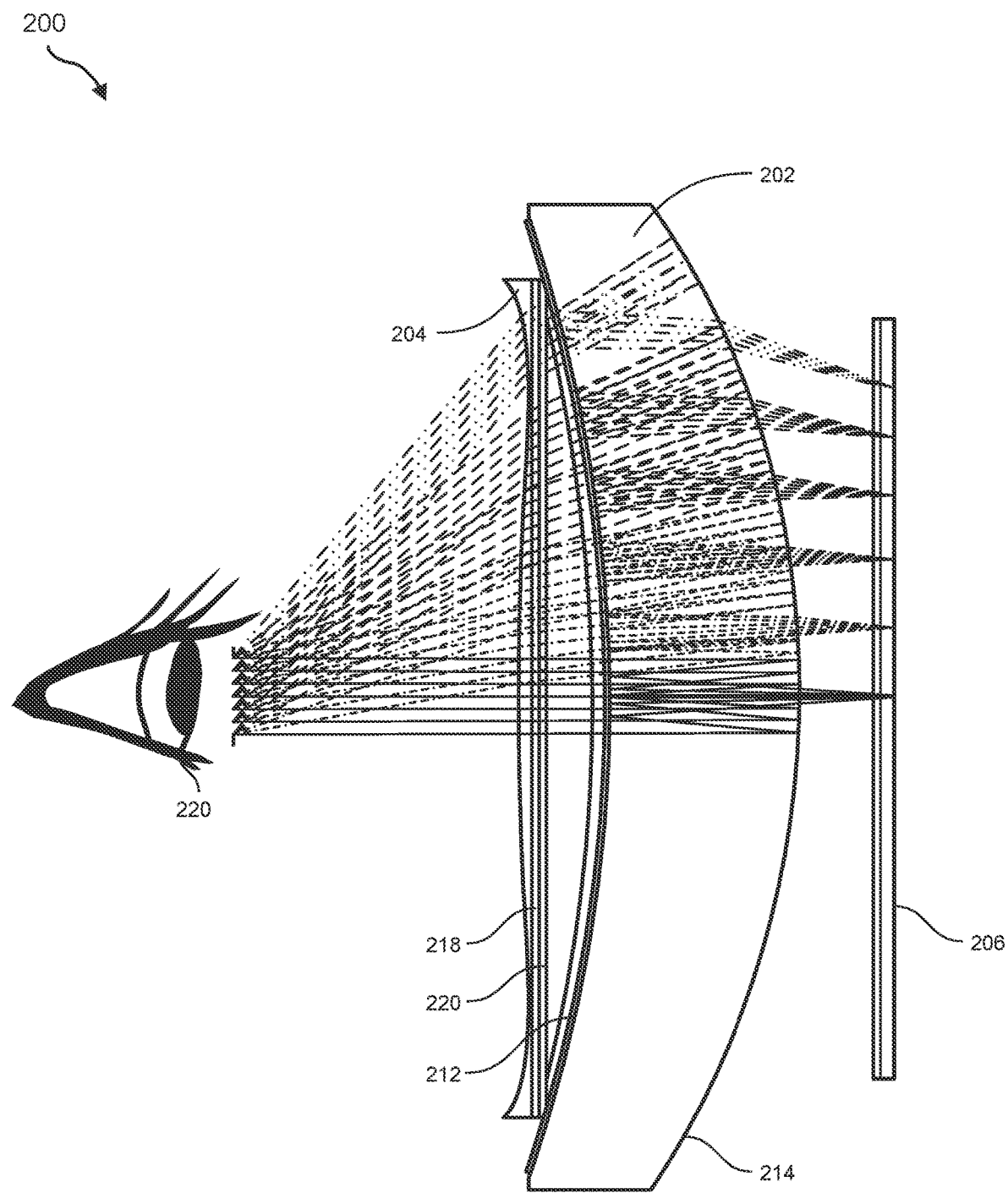
FIG. 2 illustrates example pancake lens with embedded accommodation module and an embedded eye tracking module according to some embodiments.

FIG. 2 illustrates example pancake lens 200 with embedded accommodation module and an embedded eye tracking module. As shown in FIG. 2, pancake lens 200 may include a lens 202 and a lens 204. Pancake lens 200 may also include a beamsplitter 214 and a reflective polarizer 212. Additionally, pancake lens 200 may include an accommodation module 218.

In addition, pancake lens 200 may include an eye tracking module 220. In some examples, eye tracking module 220 may be planar. In various examples, eye tracking module 220 may include one or more waveguides, one or more photodiodes, one or more photonic integrated circuits, one or more illumination elements, and/or one or more cameras.

As illustrated in FIG. 2, in some embodiments eye tracking module 220 may be embedded into lens 204. For example, as described above with reference to lens 104 in FIG. 1, and as will be described in greater detail below, lens 204 may be divided into two parts and eye tracking module 120 between the two parts of lens 204. In one example, eye tracking module 220 may be positioned adjacent to an accommodation module 218, also embedded into lens 204. Eye tracking module 220 may be embedded within lens 204 in any suitable manner. For example, eye tracking module 220 may be laminated to and/or bonded with accommodation module 218, forming a compound module. The compound module containing may be laminated to and/or bonded with parts of lens 204. In some examples, eye tracking module 220 may be connected to a driving circuit (e.g., using flexible cables or other means) that controls and/or actuates the eye tracking capabilities of eye tracking module 220.

Figure 3:
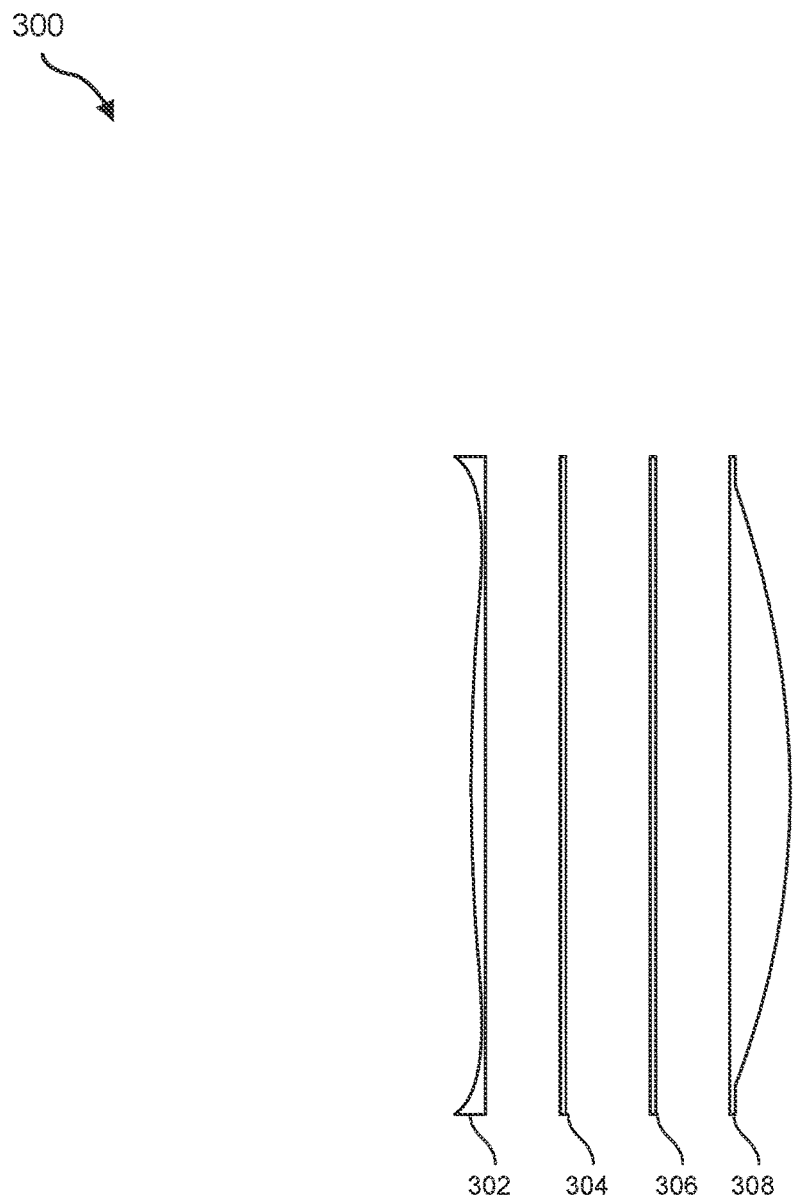
FIG. 3 shows an exploded view of a lens with embedded modules.

FIG. 3 shows an exploded view of a lens 300 with embedded modules. As shown in FIG. 3, lens 300 may include lens part 302, a module 304 (e.g., an accommodation module), a module 306 (e.g., an eye tracking module), and a lens part 308. As may be appreciated, lens 300 may include additional planar modules positioned between lens part 302 and lens part 308. Examples of additional planar modules include, without limitation, additional liquid crystal lenses, chromatic aberration correctors (e.g., based on Pancharatnam Berry Phase lenses), illumination modules for eye tracking, and imaging modules for eye tracking.

Figure 4:
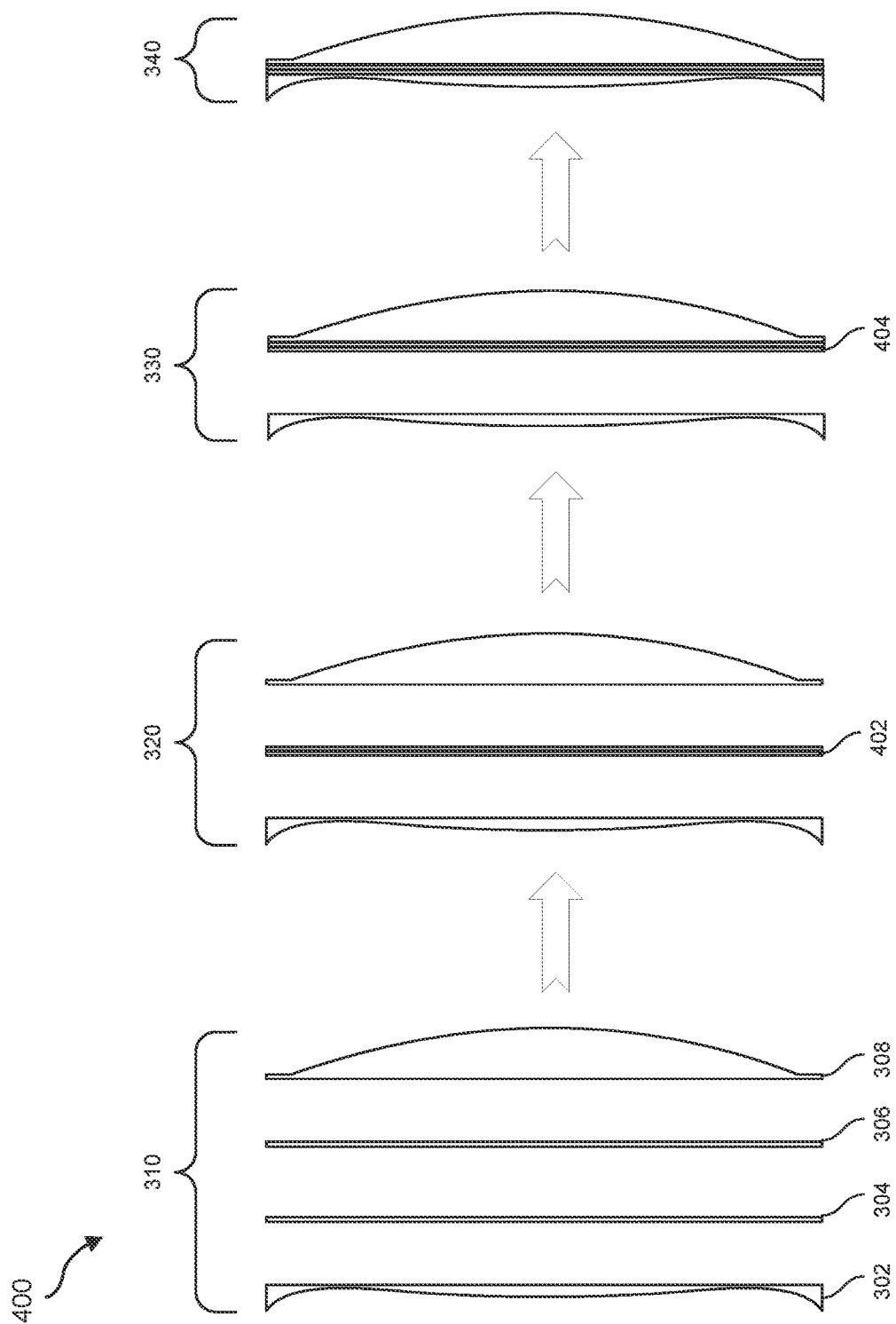
FIG. 4 illustrates a method of manufacture for a lens with embedded modules according to certain embodiments.

FIG. 4 illustrates a method of manufacture 400 for lens 300 of FIG. 3 according to certain embodiments. As shown in FIG. 4, at a stage 310 lens 300 may be in separate parts. In one example, lens part 308 may be manufactured using injection molding. Similarly, in some examples, lens part 302 may be manufactured using injection molding. At a stage 320, module 304 and module 306 may be laminated together, creating an intermediate module 402. At a stage 330, intermediate module 402 may be laminated together with lens part 308, creating an intermediate module 404. At a stage 340, lens part 302 may be laminated to intermediate module 404, producing lens 300. Alternatively, in some examples, lens part 302 may be deposited by an additive manufacturing process (e.g., "3D printing") onto intermediate module 404.

Figure 5:
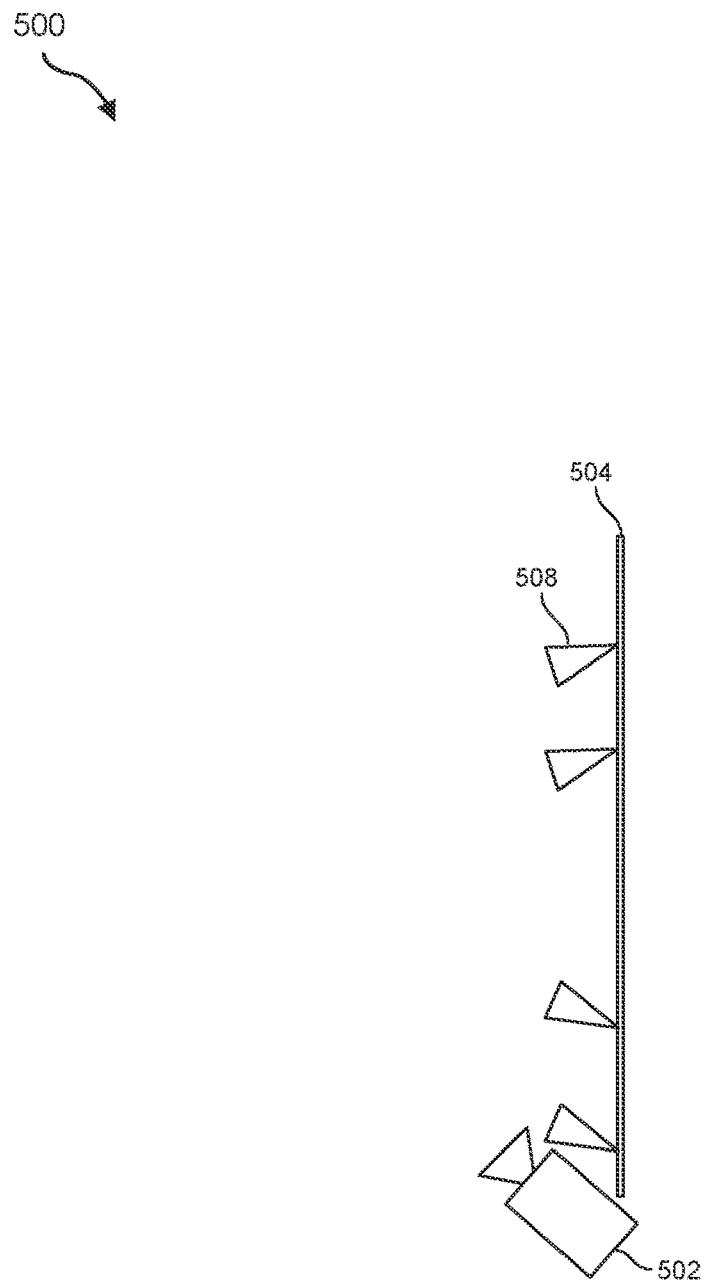
FIG. 5 illustrates an example eye tracking module according to some embodiments.

FIG. 5 illustrates an example eye tracking module 500. As shown in FIG. 5, eye tracking module 500 may include a camera 502 positioned at the edge of eye tracking module 500 (and, so, at the edge of a lens into which eye tracking module 500 is embedded) and configured to capture images of a user's eye. Eye tracking module 500 may also include a substrate 504 (e.g., including glass and/or polycarbonate). In some examples, substrate 504 may include one or more illumination elements, producing illumination 508 directed toward a user's eye. Eye tracking module 500 may send one or more images of a user's eye to an eye tracking processing module that determines, based on the image, a direction of the eye's gaze. Additionally or alternatively, eye tracking module 500 may include one or more processing components that pre-processes one or more images of the user's eye to extract image feature information that indicates a direction of the eye's gaze.

Figure 6:
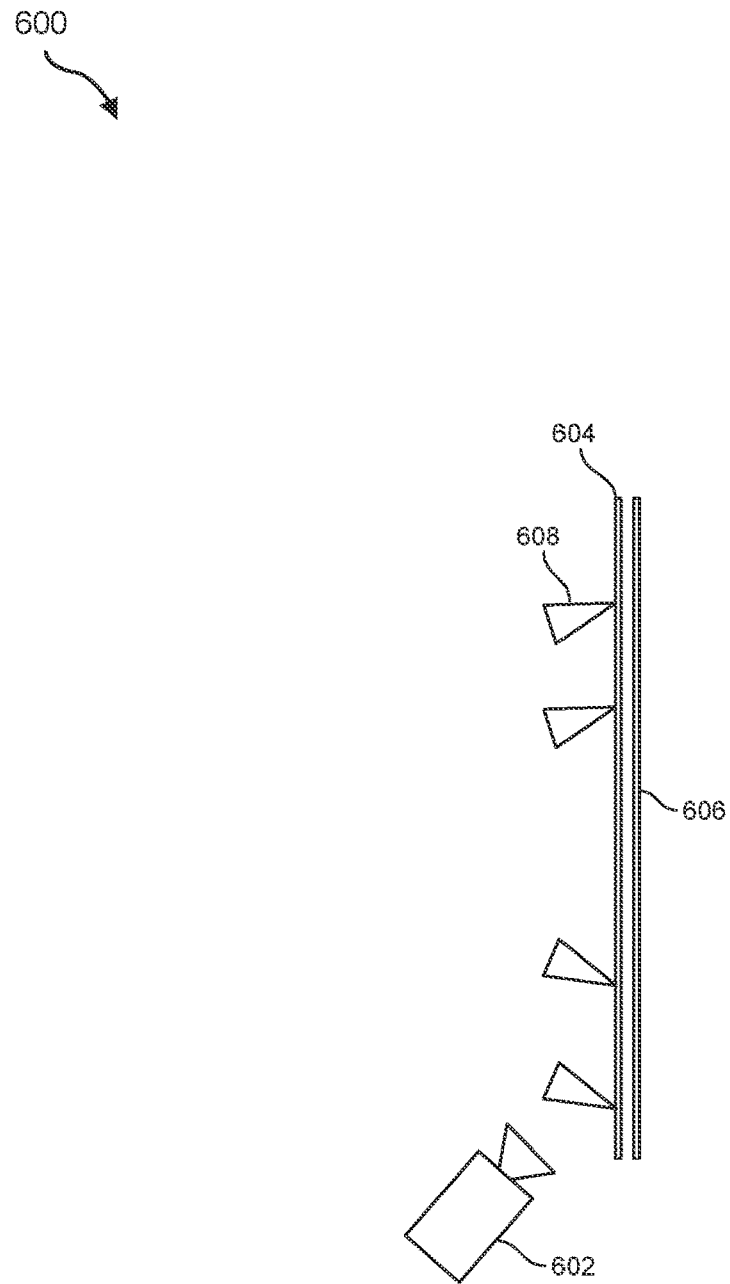
FIG. 6 illustrates another example eye tracking module according to some embodiments.

FIG. 6 illustrates another example eye tracking module 600. As shown in FIG. 6, eye tracking module 600 may include a camera 602. In some examples, camera 602 may be positioned separately from the rest of eye tracking module 600 (e.g., near a user's temple, such as on the arm of glasses in which one or more of the lenses described herein are mounted). Eye tracking module 600 may also include a substrate 604 (e.g., including glass and/or polycarbonate). In some examples, substrate 604 may include one or more illumination elements, producing illumination 608. In addition, eye tracking module 600 may include a holographic optical element ("HOE") combiner 606. In some examples, HOE combiner 606 may be a film applied to substrate 604. HOE combiner 606 may reflect images of a user's eye to camera 602. As will be shown in FIG. 9, other optical elements that are at least partially reflective may be used to reflect images of a user's eye to the camera of an eye tracking module.

Figure 7:
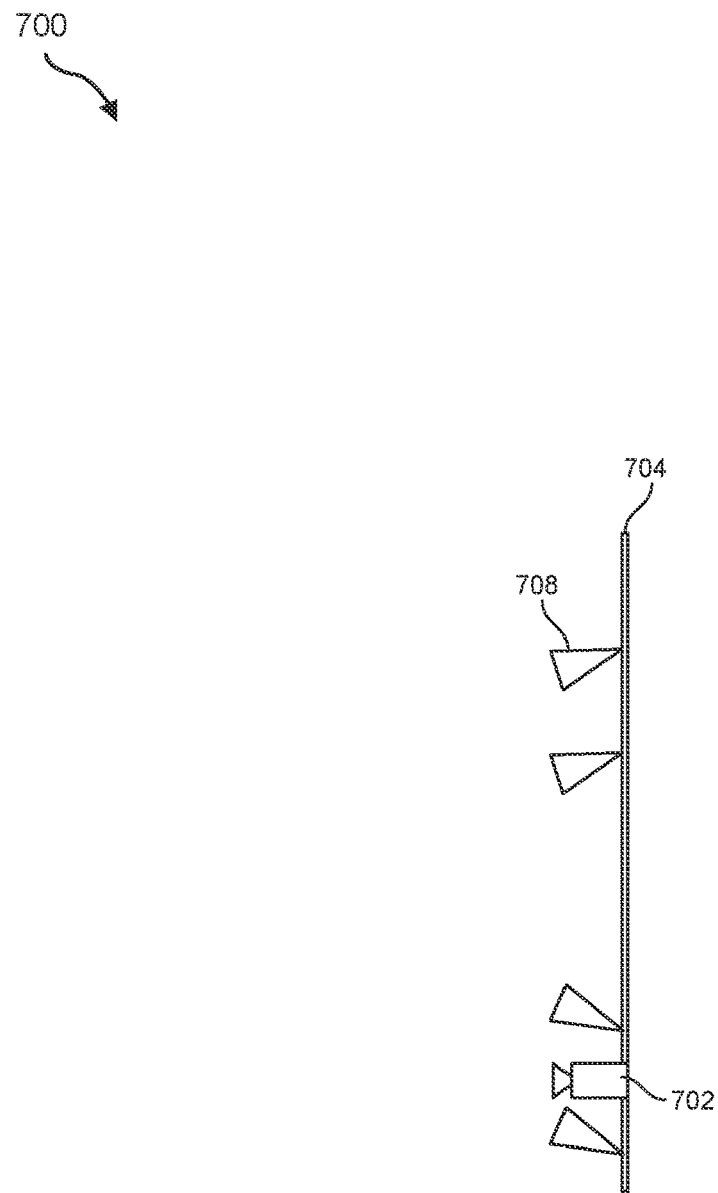
FIG. 7 illustrates another example eye tracking module according to some embodiments.

FIG. 7 illustrates another example eye tracking module 700. As shown in FIG. 7, eye tracking module 700 may include a substrate 704. Eye tracking module 700 may also include one or more cameras 702 integrated into substrate 704. Eye tracking module may additionally include one or more illumination elements, producing illumination 708.

Figure 8:
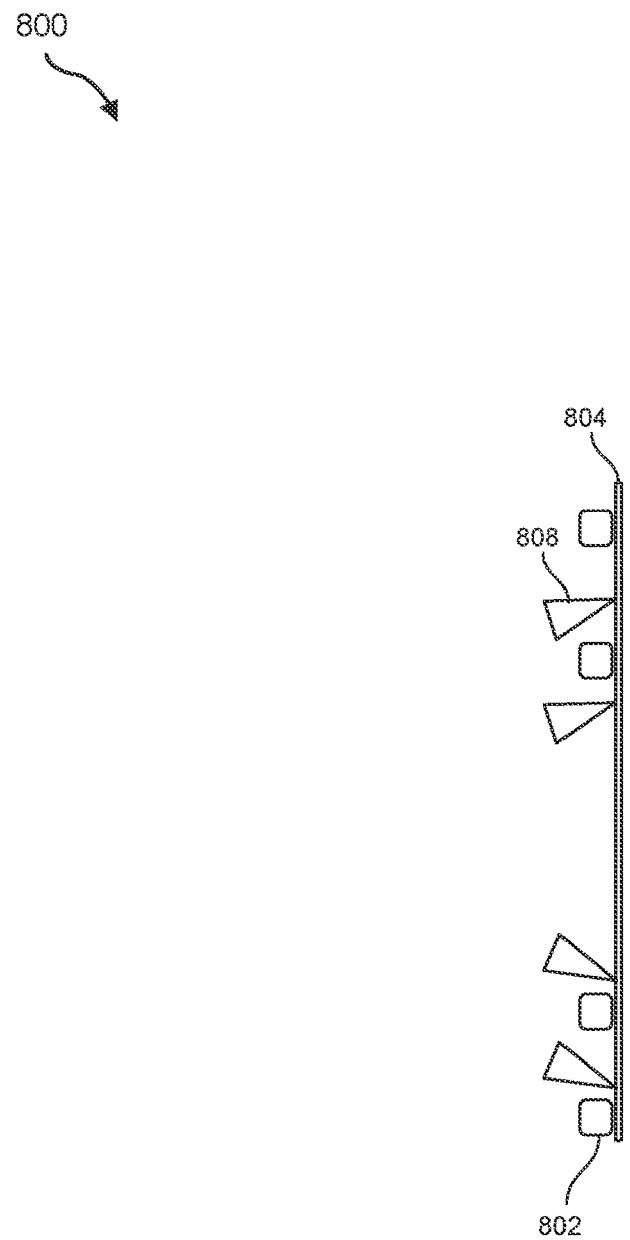
FIG. 8 illustrates another example eye tracking module according to some embodiments.

FIG. 8 illustrates another example eye tracking module 800. As shown in FIG. 8, eye tracking module 800 may include a substrate 804. Eye tracking module 800 may also include one or more sensors 802 integrated into substrate 804. Sensors 802 may be configured to sense light from a user's eye. Eye tracking module may additionally include one or more illumination elements, producing illumination 808.

Figure 9:
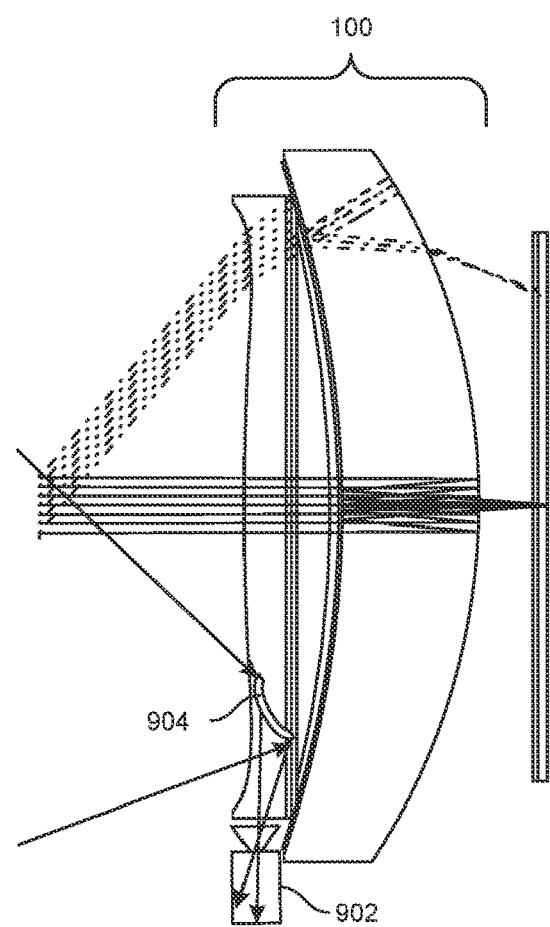
FIG. 9 illustrates another example eye tracking module according to some embodiments.

FIG. 9 illustrates another example eye tracking module 900. By way of example, eye tracking module 900 is depicted as being implemented in lens 100 from FIG. 1. As shown in FIG. 9, eye tracking module 900 may include a camera 902 and a dichroic coating 904. Dichroic coating 904 may direct light reflected from a user's eye to camera 902.

Figure 10:
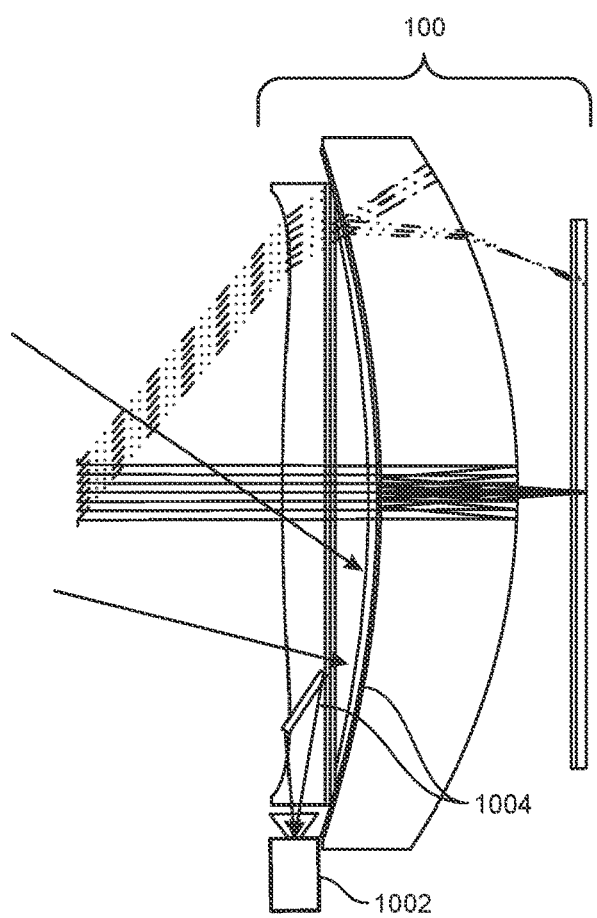
FIG. 10 illustrates another example eye tracking module according to some embodiments.

FIG. 10 illustrates another example eye tracking module 1000. By way of example, eye tracking module 1000 is depicted as being implemented in lens 100 from FIG. 1. As shown in FIG. 10, eye tracking module 1000 may include a camera 1002 and dichroic coatings 1004. Dichroic coatings 1004 may direct light reflected from a user's eye to camera 1002.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). Augmented-reality system 1100 and virtual-reality system 1200 may both represent examples of head-mounted displays. While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
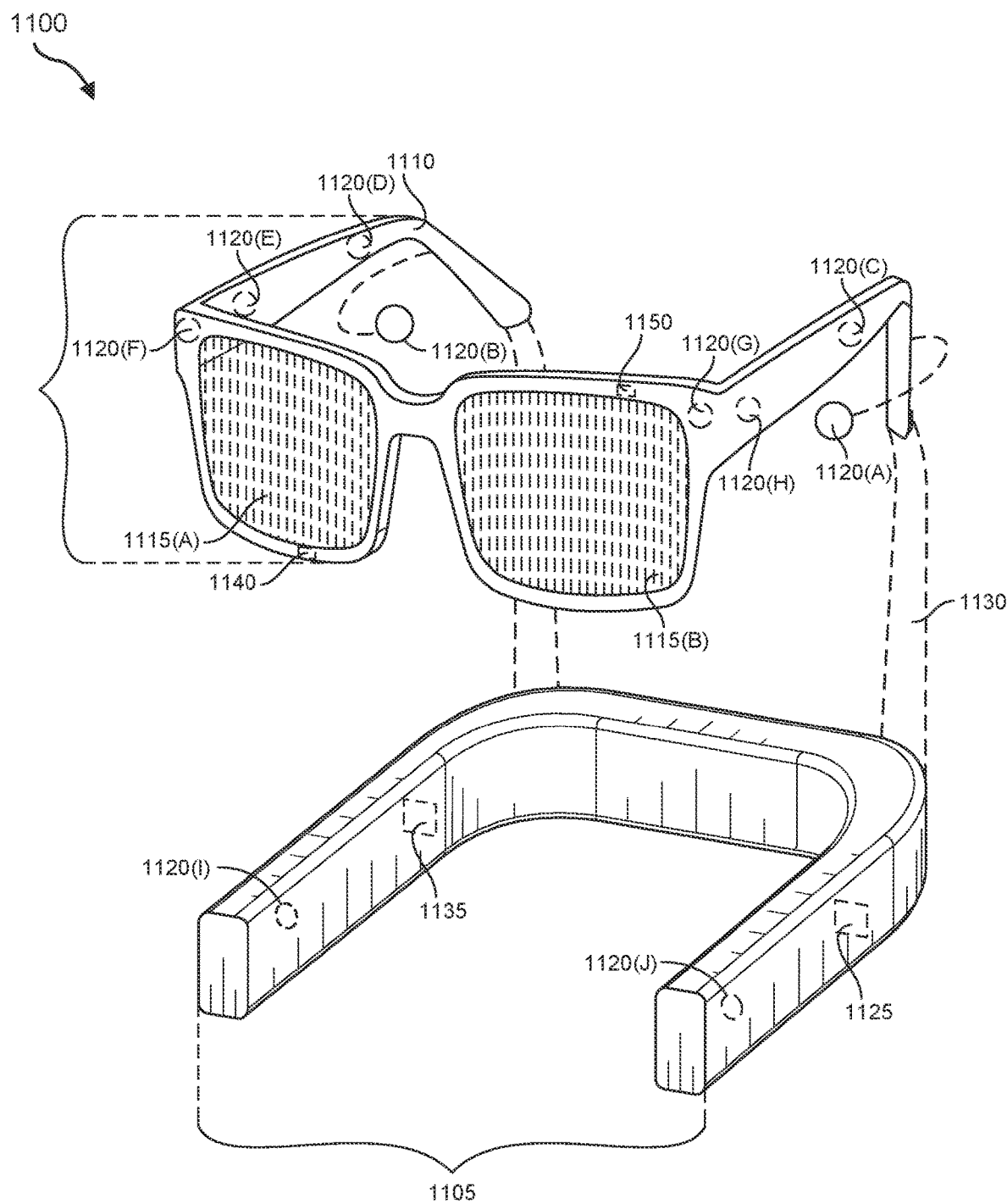
FIG. 11 is an illustration of exemplary augmented-reality glasses that may be used in connection with embodiments of this disclosure.
Figure 12:
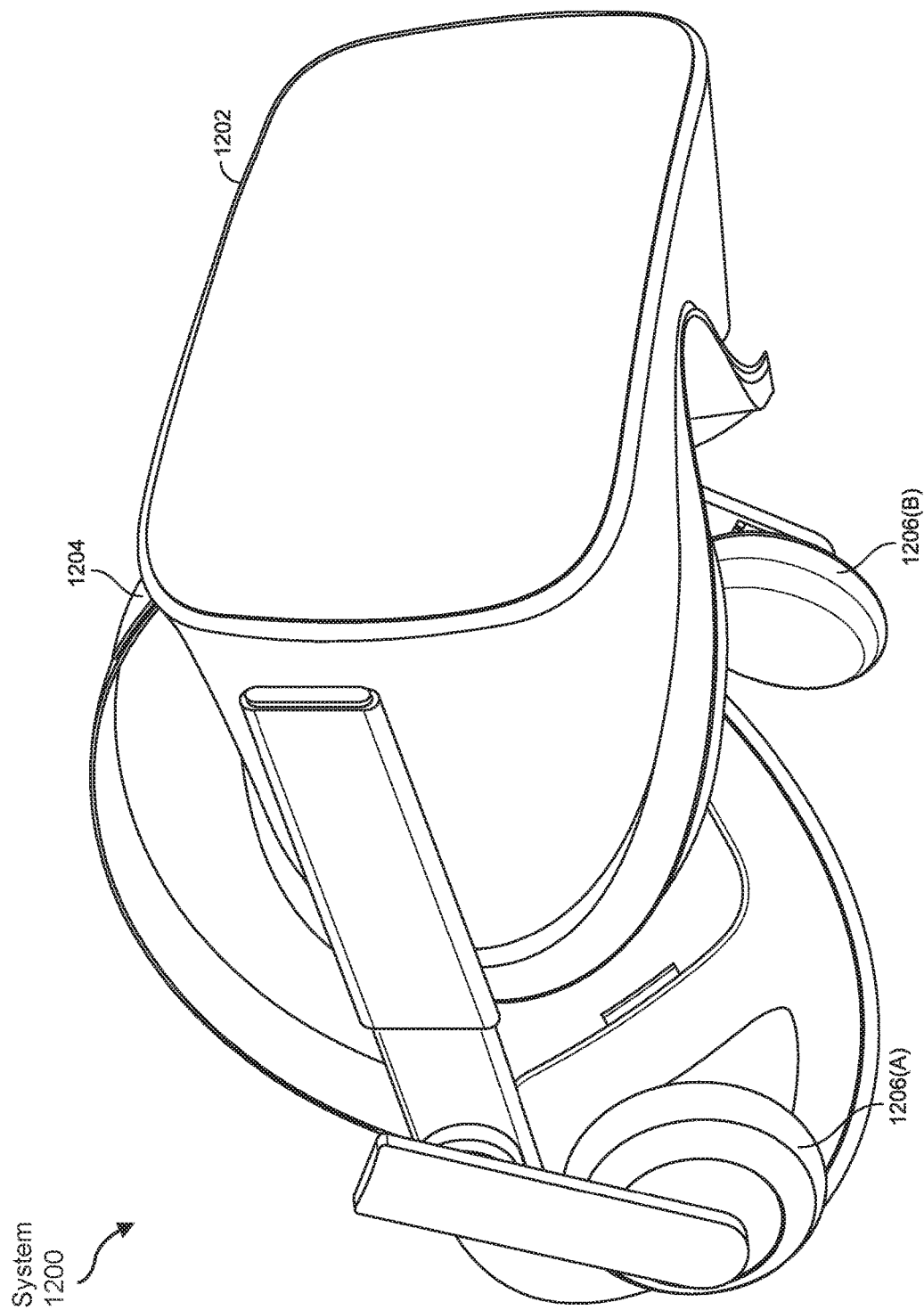
FIG. 12 is an illustration of an exemplary virtual-reality headset that may be used in connection with embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(1) and 1120(J), which may be positioned on a corresponding neckband 1105.

In some embodiments, one or more of acoustic transducers 1120(A)-(J) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120 (A) and 1120(B) may be connected to augmented-reality system 1100 via a wireless connection (e.g., a BLUETOOTH connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(1) and 1120(J) of neckband 1105 may be configured to detect sound and convert the detected sound into an electronic format (analog or digital). In the embodiment of FIG. 11, acoustic transducers 1120(1) and 1120(J) may be positioned on neckband 1105, thereby increasing the distance between the neckband acoustic transducers 1120(1) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An apparatus comprising:
a beamsplitter;
a first lens;
a reflective polarizer; and
a second lens, wherein the second lens comprises at least one planar module embedded within the second lens that comprises an eye tracking module.

2. The apparatus of claim 1, wherein the planar module corresponds to a compound module that comprises an accommodation module and the eye tracking module.

3. The apparatus of claim 2, wherein the accommodation module comprises at least one of:
a gradient-index liquid crystal lens; or
a Pancharatnam-Berry phase lens.

4. The apparatus of claim 1, wherein the eye tracking module comprises at least one illumination element.

5. The apparatus of claim 1, wherein the eye tracking module comprises at least one camera.

6. The apparatus of claim 5, wherein the eye tracking module comprises an optical element that is at least partially reflective and that reflects at least a portion of light entering the second lens to the at least one camera.

7. The apparatus of claim 1, wherein the planar module runs along a transverse axis of the second lens.

8. The apparatus of claim 1, wherein the planar module is connected to at least one driving circuit that controls an operation of the planar module.

9. The apparatus of claim 1, wherein the planar module comprises a chromatic aberration corrector.

10. The apparatus of claim 1, wherein the eye tracking module includes at least one of a waveguide, a photodiode, or a photonic integrated circuit.

11. A system comprising:
a head-mounted display comprising:
a beamsplitter;
a first lens;
a reflective polarizer; and
a second lens, wherein the second lens comprises at least one planar module embedded within the second lens that comprises an eye tracking module.

12. The system of claim 11, wherein the planar module corresponds to a compound module that comprises an accommodation module and the eye tracking module.

13. The system of claim 12, wherein the accommodation module comprises at least one of:
a gradient-index liquid crystal lens; or
a Pancharatnam-Berry phase lens.

14. The system of claim 11, wherein the eye tracking module comprises at least one illumination element.

15. The system of claim 11, wherein the eye tracking module comprises at least one camera.

16. The system of claim 15, wherein the eye tracking module comprises an optical element that is at least partially reflective and that reflects at least a portion of light entering the second lens to the at least one camera.

17. The system of claim 11, wherein the planar module runs along a transverse axis of the second lens.

18. The system of claim 11, wherein the planar module is connected to at least one driving circuit that controls an operation of the planar module.

19. The system of claim 11, wherein the eye tracking module includes at least one of a waveguide, a photodiode, or a photonic integrated circuit.

20. A method of manufacture, comprising:
coupling a beamsplitter to a first lens;
coupling a reflective polarizer to the first lens;
coupling a first part of a second lens with a first surface of planar module, wherein the planar module comprises an eye tracking module;
coupling a second part of the second lens with a second surface of the planar module; and
aligning an optical axis of the first lens with an optical axis of the second lens.

* * * * *